United States Patent
Yang et al.

(10) Patent No.: US 10,069,207 B2
(45) Date of Patent: Sep. 4, 2018

(54) ANTENNA FOR WAVE COMMUNICATION

(71) Applicants: Tae Hoon Yang, Gyeonggi-Do (KR); Jin Kyu Hwang, Incheon (KR)

(72) Inventors: Tae Hoon Yang, Gyeonggi-Do (KR); Jin Kyu Hwang, Incheon (KR)

(73) Assignee: INFAC ELECS CO., LTD. (KR)

(*) Notice: Subject to any disclaimer, the term of this patent is extended or adjusted under 35 U.S.C. 154(b) by 0 days.

(21) Appl. No.: 15/427,106

(22) Filed: Feb. 8, 2017

(65) Prior Publication Data
US 2018/0131095 A1 May 10, 2018

(30) Foreign Application Priority Data

Nov. 7, 2016 (KR) .................. 10-2016-0147580

(51) Int. Cl.
*H01Q 1/38* (2006.01)
*H01Q 9/04* (2006.01)
*H01Q 1/52* (2006.01)
*H04W 84/18* (2009.01)

(52) U.S. Cl.
CPC ........... *H01Q 9/0485* (2013.01); *H01Q 1/526* (2013.01); *H01Q 9/0407* (2013.01); *H04W 84/18* (2013.01)

(58) Field of Classification Search
CPC .......... H01Q 15/002; H01Q 1/38; H01Q 3/44; H01Q 9/0407; H01Q 9/0442; H01Q 15/0086; H01Q 1/526; H01Q 9/0485
See application file for complete search history.

(56) References Cited

U.S. PATENT DOCUMENTS

| | | | | |
|---|---|---|---|---|
| 7,042,419 B2* | 5/2006 | Werner | ..................... | H01Q 9/16 343/909 |
| 7,522,105 B1* | 4/2009 | LaComb | .................. | H01Q 1/28 343/700 MS |
| 7,760,140 B2* | 7/2010 | Kamgaing | ........... | H01Q 1/2258 343/700 MS |
| 9,030,360 B2* | 5/2015 | Jerauld | .................... | H01Q 1/52 343/700 MS |
| 9,219,313 B2* | 12/2015 | Georgescu | ............ | H01P 11/001 |

* cited by examiner

*Primary Examiner* — Tho G Phan
(74) *Attorney, Agent, or Firm* — Tarolli, Sundheim, Covell & Tummino LLP

(57) ABSTRACT

Disclosed herein is an antenna for WAVE communication, and more particularly, is an antenna for WAVE communication to which an electromagnetic bandgap is applied to a patch antenna. The antenna includes a dielectric substrate provided with conduction patterns formed on opposite surfaces thereof, first patches disposed on a first surface of the dielectric substrate at positions spaced apart from each other at regular intervals and conducted to each other, second patches disposed on a second surface of the dielectric substrate at positions spaced apart from each other at regular intervals and conducted to each other; a third patch provided in a bottom of the second surface of the dielectric substrate and conducted to the plurality of second patches, and a plurality of electromagnetic bandgap structures positioned on the first surface of the dielectric substrate and conducted to the second patches or the third patch by a through hole.

10 Claims, 10 Drawing Sheets

ANTENNA FOR WAVE COMMUNICATION

CROSS-REFERENCE TO RELATED APPLICATION

This application claims priority to Korean Patent Application No(s). 10-2016-0147580, filed on Nov. 7, 2016, the disclosure of which is incorporated herein by reference in its entirety.

BACKGROUND

Field

Exemplary embodiments for the present disclosure relate to an antenna for wireless access in vehicular environment (WAVE) communication, and more particularly, to an antenna for WAVE communication to which an electromagnetic bandgap is applied to a patch antenna.

Description of the Related Art

With the recent development of information communication technology, cooperative driving communication is suggested as a driving assistant means capable of providing security and convenience to a driver and reducing fuel consumption by establishing a wireless network by communication between vehicles and transmitting/receiving vehicle driving information to provide a group driving service. In addition, a service for transmitting/receiving road infra information through the cooperative driving communication to control a vehicle may be provided, and a security service etc. may also be provided in which speed limit information or dangerous situation information around a school road or an accident prone area is transmitted to a vehicle for controlling a vehicle speed.

FIG. 1 illustrates an embodiment of cooperative driving communication.

Referring to FIG. 1, the cooperative driving communication may be considered as a vehicle to everything (V2X) technology, which is a technology for controlling to drive a vehicle by using vehicle and road state information obtained from communication with various vehicle sensors and a surrounding communication infrastructure, and the V2X technology includes vehicle to vehicle (V2V) communication for providing a communication function between vehicles and vehicle to infrastructure (V2I) communication for providing a communication function between a vehicle and a base station around a road.

As a communication manner for such a V2X technology, a wireless access in vehicular environment (WAVE) communication manner is suggested and the WAVE communication manner uses a frequency band of about 5.850 GHz to about 5.925 GHz as near field communication for supporting an intelligent transport system (ITS) application field based on an IEEE 802.11p standard.

An antenna for the ITS for supporting the WAVE communication manner is mounted on a position at which a mirror effect and a ground effect may be properly used by using a vehicle roof of a steel material in order to maximize communication performance of the vehicle. Even a current WAVE antenna is also mounted on the vehicle roof to be optimized to allow communication to a distance as long as possible.

When an existing WAVE antenna is mounted on the vehicle roof, an electric field strength increases according to a distance but a radio wave interference factor is generated by a surface wave according to a mount position and a roof shape and accordingly performance may be degraded.

Even when the WAVE antenna is installed in an integrated type or is installed solely on an iron beam such as a traffic light, a similar radio wave interference factor may be generated to cause performance degradation.

SUMMARY

An object of the present disclosure is to provide an antenna for WAVE communication to which an electromagnetic bandgap is applied in order to improve performance thereof.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with one aspect of the present disclosure, an antenna may include: a dielectric substrate provided with conduction patterns formed on opposite surfaces thereof; a plurality of first patches disposed on a first surface of the dielectric substrate at positions spaced apart from each other at regular intervals, and conducted to each other, each of the first patches having a rectangular shape; a plurality of second patches disposed on a second surface of the dielectric substrate at positions spaced apart from each other at regular intervals, and conducted to each other, each of the second patches having a rectangular-shape; a third patch provided in a bottom of the second surface of the dielectric substrate and conducted to the plurality of second patches; and a plurality of electromagnetic bandgap structures positioned on the first surface of the dielectric substrate and conducted to the plurality of second patches or the third patch by a through hole.

The plurality of electromagnetic bandgap structures may be positioned on the first surface of the dielectric substrate at positions corresponding to the second patches or the third patch.

Each of the electromagnetic bandgap structures may include a plurality of unit cells having a predetermined shape, the plurality of unit cells may be spaced apart from each other at regular intervals, and each of the plurality of unit cells may be conducted to the second patches or the third patch by a through hole.

The unit cell may have a square shape and a resonant frequency ($\omega_0$) of the antenna may be determined by adjusting a length (W) of one side of the unit cell and the interval (g) between the unit cells.

The length (W) of one side of the unit cell and the interval (g) between the unit cells may be determined by equations of $$\omega_0 = \frac{1}{\sqrt{LC}}, L = \mu_0 h, \text{ and } C = \frac{W\varepsilon_0(1+\varepsilon_r)}{\pi \cosh^{-1}\left(\frac{W+g}{g}\right)}$$

where $\mu_0$ denotes permeability in vacuum and $\mu_0 = 4\pi \times 10^{-7}$ [H/m], h denotes a height of the dielectric substrate, $\varepsilon_0$ denotes permittivity in vacuum and is $\varepsilon_0 = 8.854 \times 10^{-12}$ [F/m], and $\varepsilon_r$ is a dielectric constant of the dielectric substrate.

The dielectric substrate may be manufactured with any one or more materials of FR-4, Teflon and an epoxy resin.

It is to be understood that both the foregoing general description and the following detailed description of the present disclosure are exemplary and explanatory and are intended to provide further explanation of the invention as claimed.

BRIEF DESCRIPTION OF THE DRAWINGS

The above and other objects, features and other advantages of the present disclosure will be more clearly understood from the following detailed description taken in conjunction with the accompanying drawings, in which.

DESCRIPTION OF EXEMPLARY EMBODIMENTS

Figure 1:
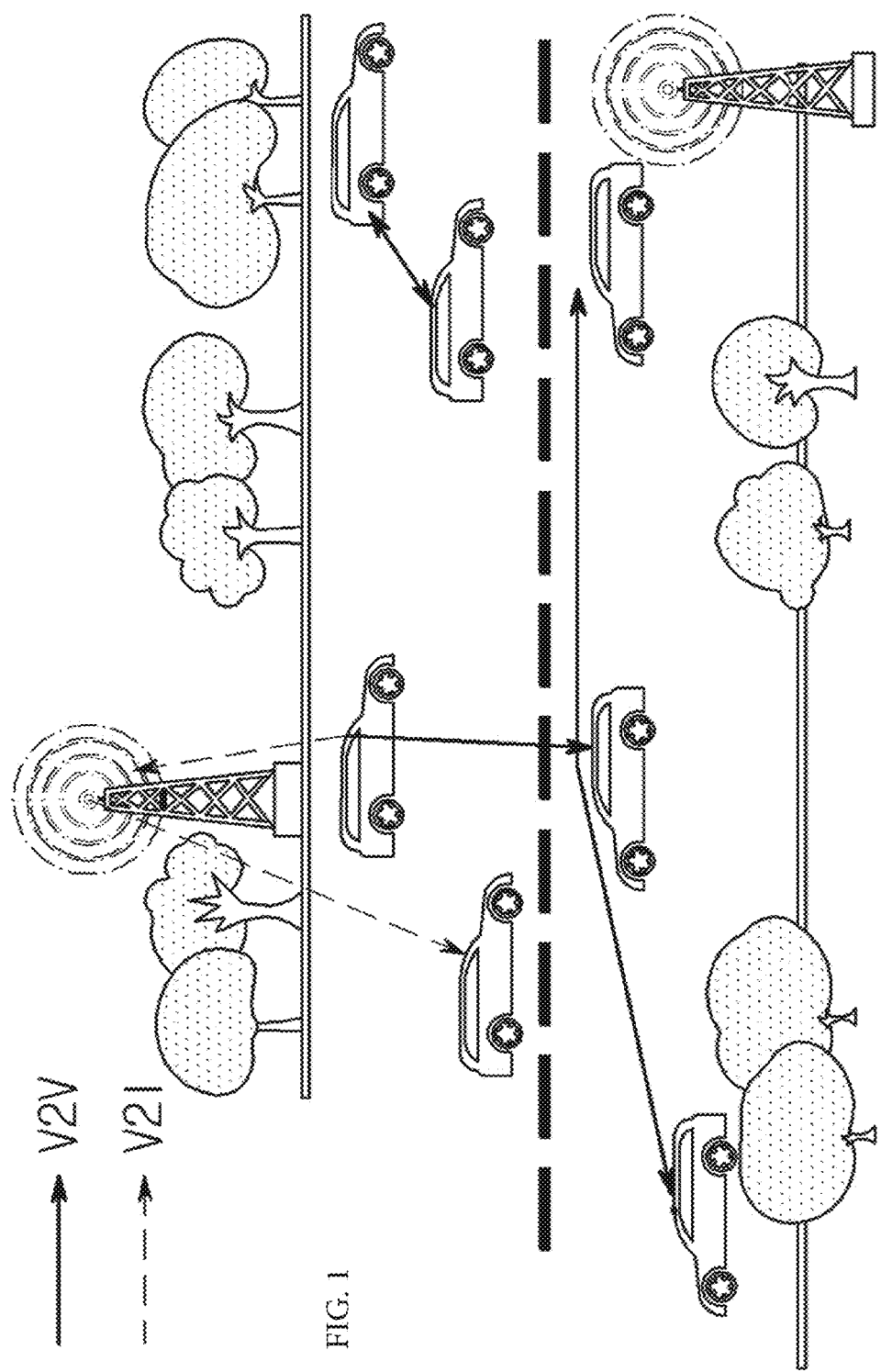
FIG. 1 a view showing an embodiment of cooperative driving communication.

For clarity of explanation of the present disclosure, portions that are not related to the description are omitted and identical or similar components are denoted with the same reference numerals throughout the description.

In addition, if certain parts are described as being "connected" to other parts, they are not only "directly connected" to the other parts, but also "indirectly connected" to the other parts with any other device intervened therebetween. In addition, when an element is referred to as "comprising" or "including" a component, it does not preclude another component but may further include the other component unless the context clearly indicates otherwise.

It will be understood that when an element is referred to as being "on" another element, it may be directly on another element or intervening elements may be present therebetween. In contrast, when an element is referred to as being "directly on" another element, there are no intervening elements therebetween.

The terms "first," "second," "third" and the like are used to illustrate different parts, components, areas, layers and/or sections, but are not limited thereto. The terms are used to differentiate a certain part, component, area, layer or section from other part, component, area, layer or section. Accordingly, a first part, component, area, layer or section, which will be mentioned hereinafter, may be referred to as a second part, component, area, layer or section without departing from the scope of the present disclosure.

The technical terms used herein are set forth to mention specific embodiments of the present disclosure, and do not intend to define the scope of the present disclosure. In addition, it is to be understood that the singular forms "a," "an," and "the" include plural referents unless the context clearly dictates otherwise. In the present specification, the terms "have", "include", "comprise" and the like are used to embody certain characteristics, region, integer, step, operation, element, component, and the like, and are not used to exclude existence or addition of other components, such as characteristics, region, integer, step, operation, element, component, and the like.

Spatially relative terms, such as "below", "above", and the like, may be used herein for ease of description to describe one element or feature's relationship to another element or feature as illustrated in the figures. It will be understood that the spatially relative terms are intended to encompass different orientations of the device in use or operation in addition to the orientation depicted in the drawings. For example, if the device in the figures is turned over, elements described as "below" other elements or features would then be oriented "above" the other elements or features. Thus, the exemplary term "below" may encompass both an orientation of above and below. Devices may be otherwise rotated 90 degrees or at other angles and the spatially relative descriptors used herein interpreted accordingly.

Unless otherwise defined, all terms used herein, including technical or scientific terms, have the same meanings as those generally understood by those with ordinary knowledge in the field of art to which the present disclosure belongs. Such terms as those defined in a generally used dictionary are to be interpreted to have the meanings equal to the contextual meanings in the relevant field of art, and are not to be interpreted to have idealized or excessively formal meanings unless clearly defined in the present disclosure.

A horizontal direction referred hereinbelow means a direction parallel to the ground and a vertical direction means a direction perpendicular to the horizontal direction. In addition, the bottom means a downward portion and the top means an upward portion at the time of installation.

Hereinafter, embodiments of the present disclosure will be described in detail with reference to the accompanying drawings so that the present disclosure may be easily realized by those skilled in the art. The present disclosure may be practiced in various ways and is not limited to the embodiments described herein.

Figure 2:
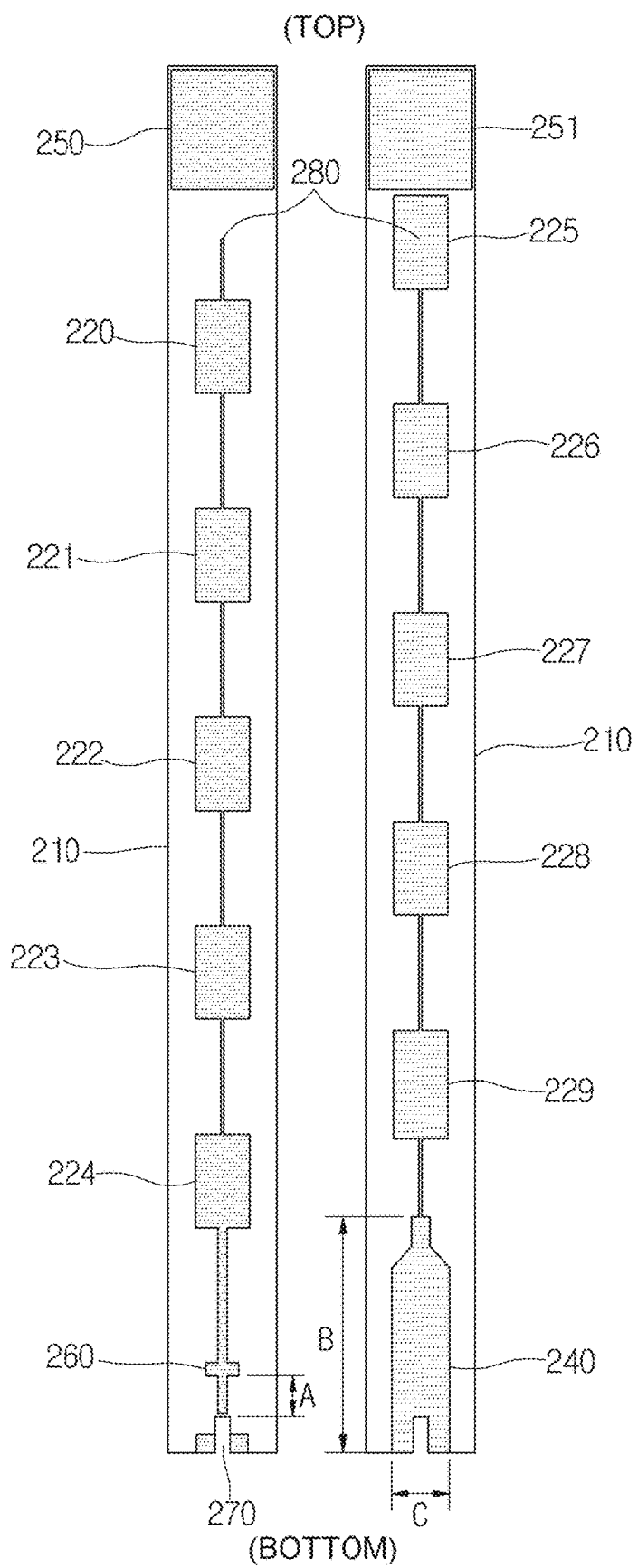
FIG. 2 is a view showing a antenna structure according to the present disclosure and shows that conduction patterns are implemented on one surface and the other surface of a dielectric substrate.

FIG. 2 is a view showing a structure of an antenna according to the present disclosure and shows that conduction patterns are implemented on one surface and the other surface of a dielectric substrate.

Referring to FIG. 2, conduction patterns may be implemented on both sides of the dielectric substrate 210. As a material of the dielectric substrate 210, Teflon, FR4, an epoxy resin or the like. Identically to a typical antenna, first patches 220 to 224 and second patches 225 to 229, which are typical conduction patterns of a rectangular shape may be disposed such that distances between the first patches 220 to 224 are equal and distances between the second patches 225 to 229 are equal. As an embodiment, the equidistance may be set to 0.5 times of a wavelength desired to be transmitted by an antenna. In addition, the sizes of the patches 220 to 229 may have lengths of about 8 mm to about 12 mm in a horizontal direction and about 14 mm to about 18 mm in a vertical direction.

In addition, when used for a base station, a shadow area in which a signal of the base station does not reach may occur in a bottom side. In order to minimize such a shadow area, a third patch 240, which is a conduction pattern having a larger size than the second patches disposed equidistantly in the bottom of the other surface of the dielectric substrate 210, may be additionally provided. Equidistant and non-uniform feeding is realized by this third patch 240, and a lower side radiation pattern may be additionally formed in addition to a radiation pattern of an existing antenna.

The size of this third patch 240 may be set to have a length between about 9 mm to about 12 mm in the horizontal direction C and a length between about 33 mm to about 41 mm in the vertical direction B. When the third patch 240 has the foregoing size, a size of the shadow area in the lower side of the base station may be minimized.

In the top of the dielectric substrate 210, parasite patches 250 and 251, which are conduction patterns of a rectangular shape, may be formed on both surfaces of the dielectric substrate 210. The radiation pattern radiated from the antenna may be more concentrated toward the lower side by these parasite patches 250 and 251. The parasite patches 250 and 251 are conducted with each other but may be configured of separate patterns that are not conducted with other patches.

In addition, a via hole 280 for conducting a first patch on one surface of the dielectric substrate 210 with a second patch on the other surface may be further provided. Due to the via hole 280, a closed loop current may flow and broadband characteristics may be obtained. In detail, the first patch on the one surface of the dielectric substrate 410 is connected to a (+) terminal of an input signal and the second patch on the other surface is connected to (−) terminal or the ground. When the first patch on the one surface is conducted with the second patch on the other surface through the via hole 280, the current is able to flow from (+) terminal to (−) terminal and then the closed loop current may flow.

The antenna may also be additionally provided with a stub pattern 260 in the bottom of one surface of the dielectric substrate 210. The stub pattern 260 is used for adjusting a resonant frequency and forming a broadband. In order for the resonant frequency to be in between about 5850 MHz to about 5925 MHz, the size of the stub pattern 260 may be about 5 mm in a horizontal direction and about 2 mm in a vertical direction, and a distance A for connection with a cable connecting unit, which is in the bottom of the dielectric substrate 210, from a hole 270 to the stub pattern 260 may be about 5.5 mm to about 6.5 mm.

When the foregoing WAVE antenna of which resonant frequency is between about 5850 MHz and about 5925 MHz contacts the vehicle roof of a metal material, a null is generated by an interference wave to cause performance degradation.

Figure 3:
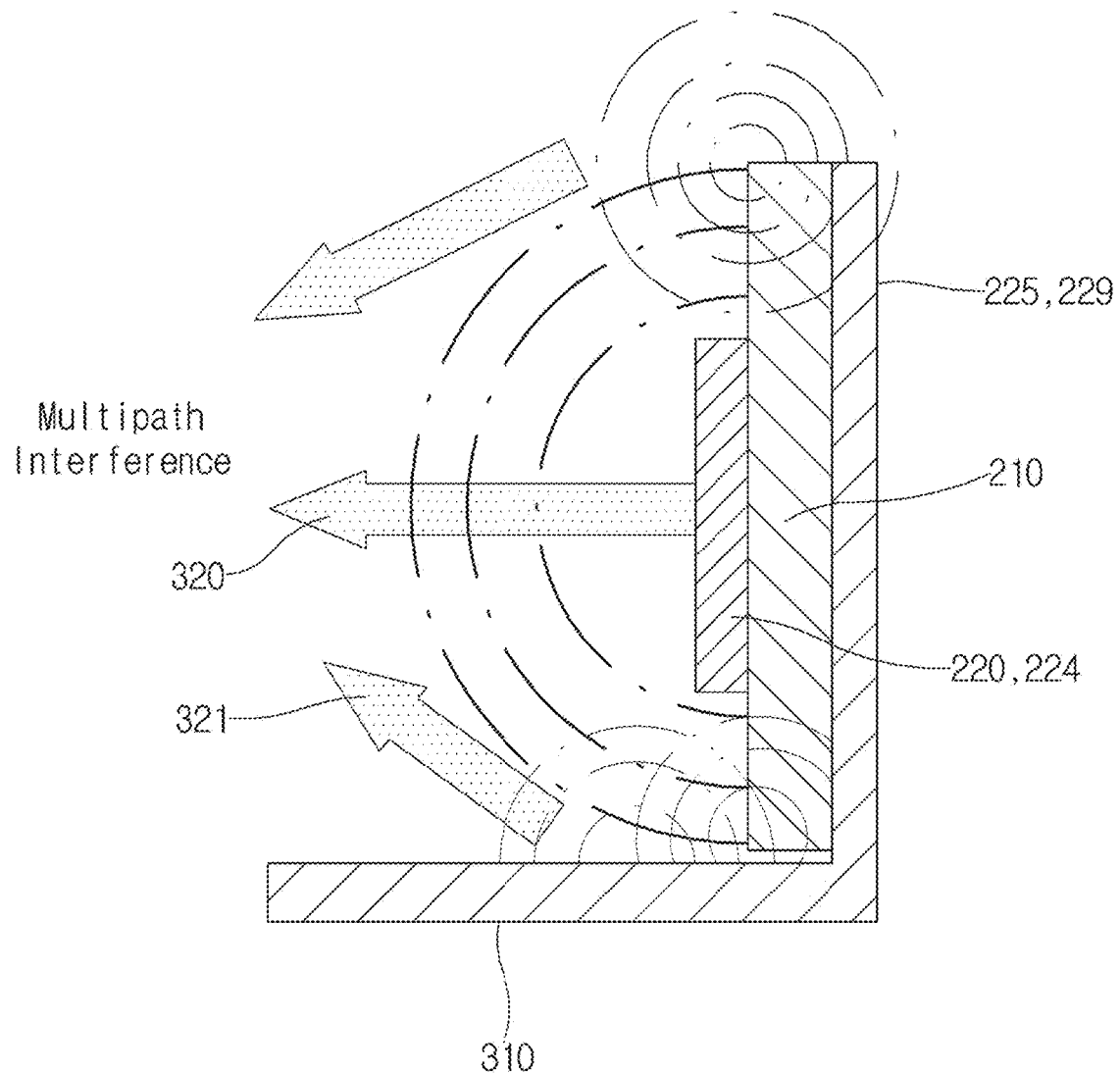
FIG. 3 is a view illustrating an example of an interference wave due to a metal body of a vehicle roof in the antenna structure according to the present disclosure.

FIG. 3 is a view illustrating an example of an interference wave due to a metal body of a vehicle roof in the antenna structure according to the present disclosure.

Referring to FIG. 3, a circle waveform 320 of an omni-directional antenna is interfered by an interference wave 321, which is caused by reflection by the vehicle roof 310, to generate a null in a specific area due to interferences by each other, which results in performance degradation.

In order to prevent such a phenomenon, an electromagnetic bandgap structure may be used.

The electromagnetic bandgap structure enables propagation of an electromagnetic wave to be efficiently controlled in order to solve an interference phenomenon with surrounding antennas in multi-bands according to mixed-use of vehicle antennas, a structural hindrance phenomenon such as a small size, a low profile, a planar and conformal configuration according to the size of the antenna, a side lobe generation and gain degradation phenomenon due to metal ground of the vehicle roof.

Figure 4:
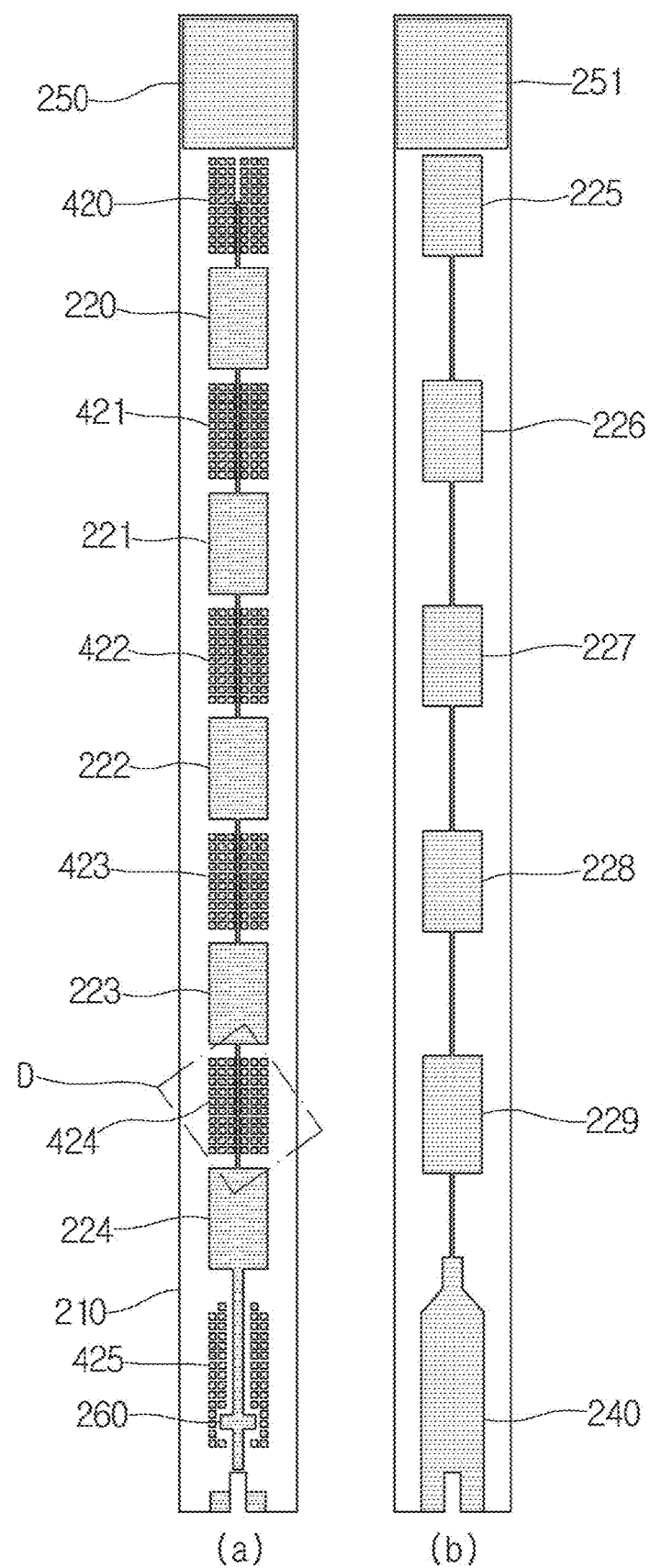
FIG. 4 is a view illustrating an antenna structure to which an electromagnetic bandgap is applied according to an embodiment of the present disclosure.
Figure 5:
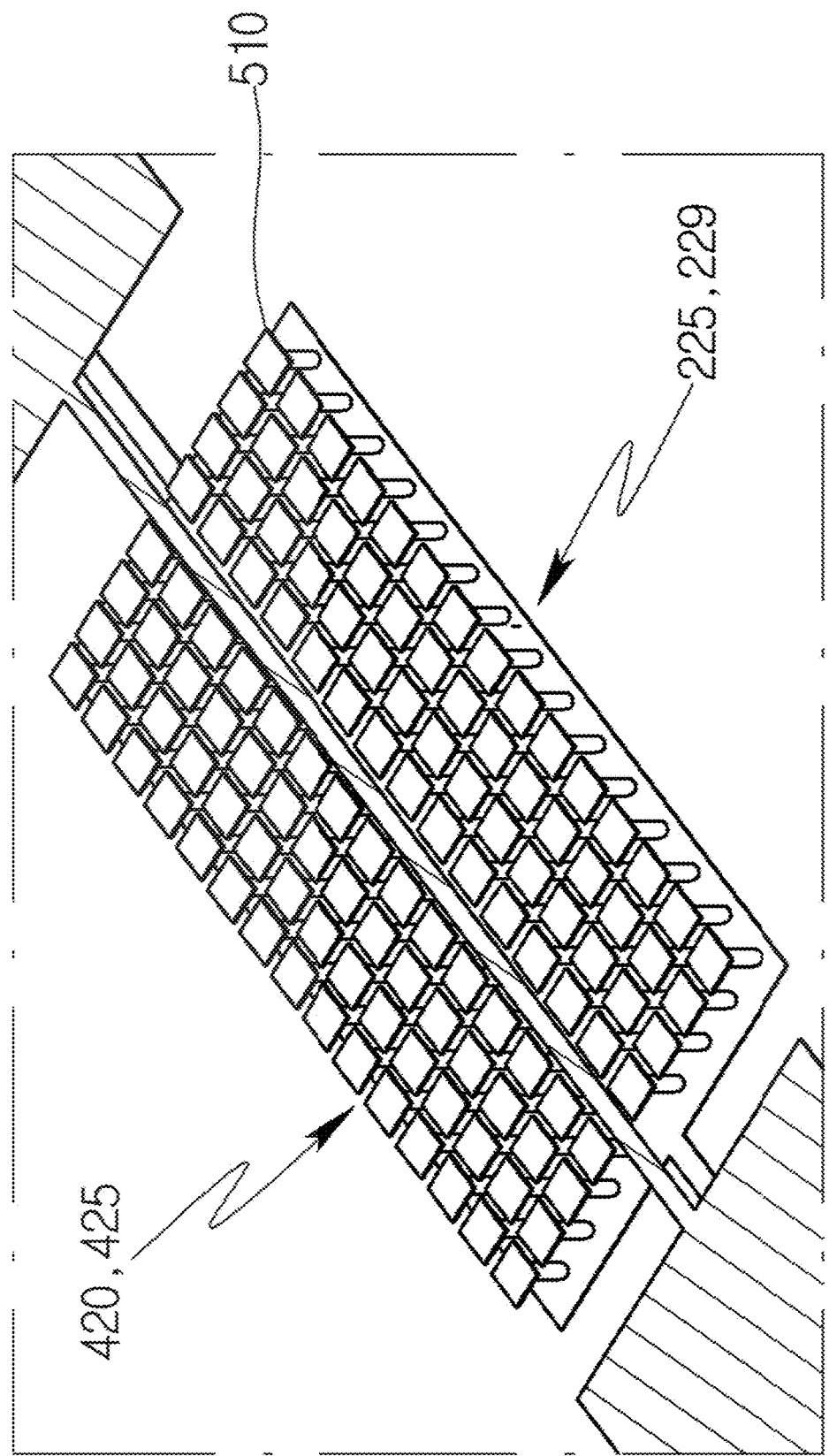
FIG. 5 is an enlarged view of the D portion of FIG. 4.

FIG. 4 is a view illustrating an antenna structure to which an electromagnetic bandgap is applied according to an embodiment of the present disclosure, and FIG. 5 is an enlarged view of the D portion of FIG. 4.

Referring to FIGS. 4 and 5, the electromagnetic bandgap structures 420 to 425 may be positioned at portions between the first patches 220 to 224 of one surface and corresponding to the second patches 225 to 229 and the third patch 240 on the other surface by position. In addition, the electromagnetic structures 420 to 425 are structures in which a unit cell 510 having a specific shape (may be a circle, square, rectangle, regular hexagon, equilateral triangle, or triangle) is periodically repeated. In other words, the electromagnetic bandgap structures 420 to 425 are structures in which a plurality of unit cells 510 having an identical size are disposed separately from each other in an identical interval. In addition, the unit cells 510 of the electromagnetic structures 420 to 425 pass through the dielectric substrate 210 by a through hole to be connected to the second patches 225 to 229 and/or the third patch 240. The second and third patches may be finally connected to the ground. Such an electromagnetic bandgap structure has a frequency cut-off characteristic that an electromagnetic wave in a specific frequency band is not allowed to propagate, and an antenna gain and a reflection loss may be improved. In addition, a surface wave, which is generated at the time of using an antenna with a substrate having a high permittivity, is reduced and accordingly radiation characteristics and a gain may be improved. When a plurality of antennas are arrayed, since characteristics of the electromagnetic bandgap structure enable mutual coupling between antennas to be reduced, high speed mobile communication may be handled in a WAVE communication manner and a connected range may also be enlarged.

Figure 6:
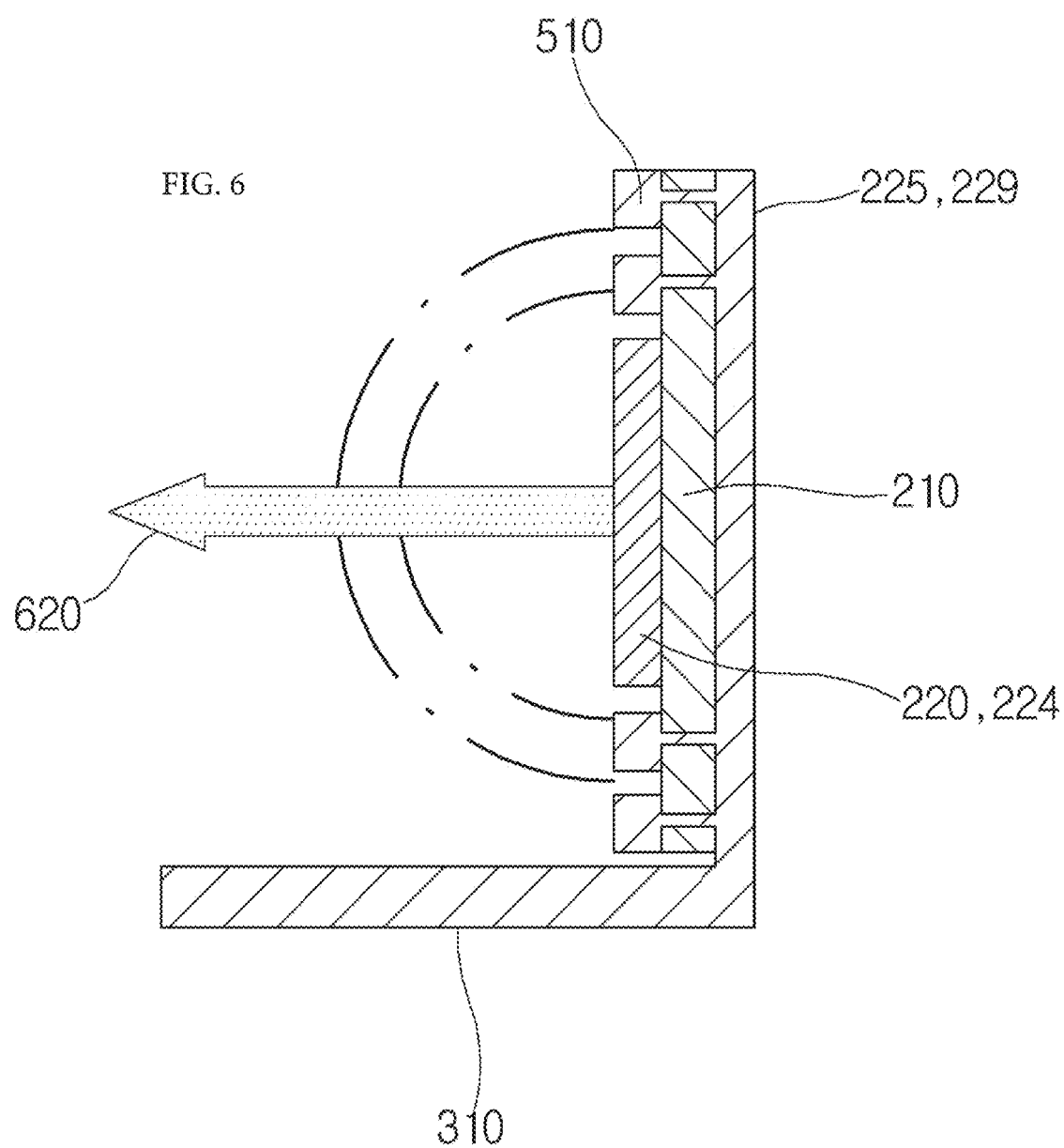
FIG. 6 is view illustrating that an interference is improved by an electromagnetic bandgap.

FIG. 6 is view illustrating that an interference is improved by an electromagnetic bandgap.

Referring to FIG. 6, an interference wave such as a reflection wave by a vehicle roof, which is generated in a structure without an electromagnetic bandgap, is removed by the electromagnetic gap structures 420 to 425 and only an electromagnetic wave 620 in the vertical direction of the antenna may be generated.

As illustrated in FIG. 6, a surface wave forbidden band may suppress surface wave radiation and minimize mutual coupling in an arrayed antenna, and the forbidden band may be determined by permittivity, the size of unit cell 510, and the interval between the unit cells 510.

Figure 7:
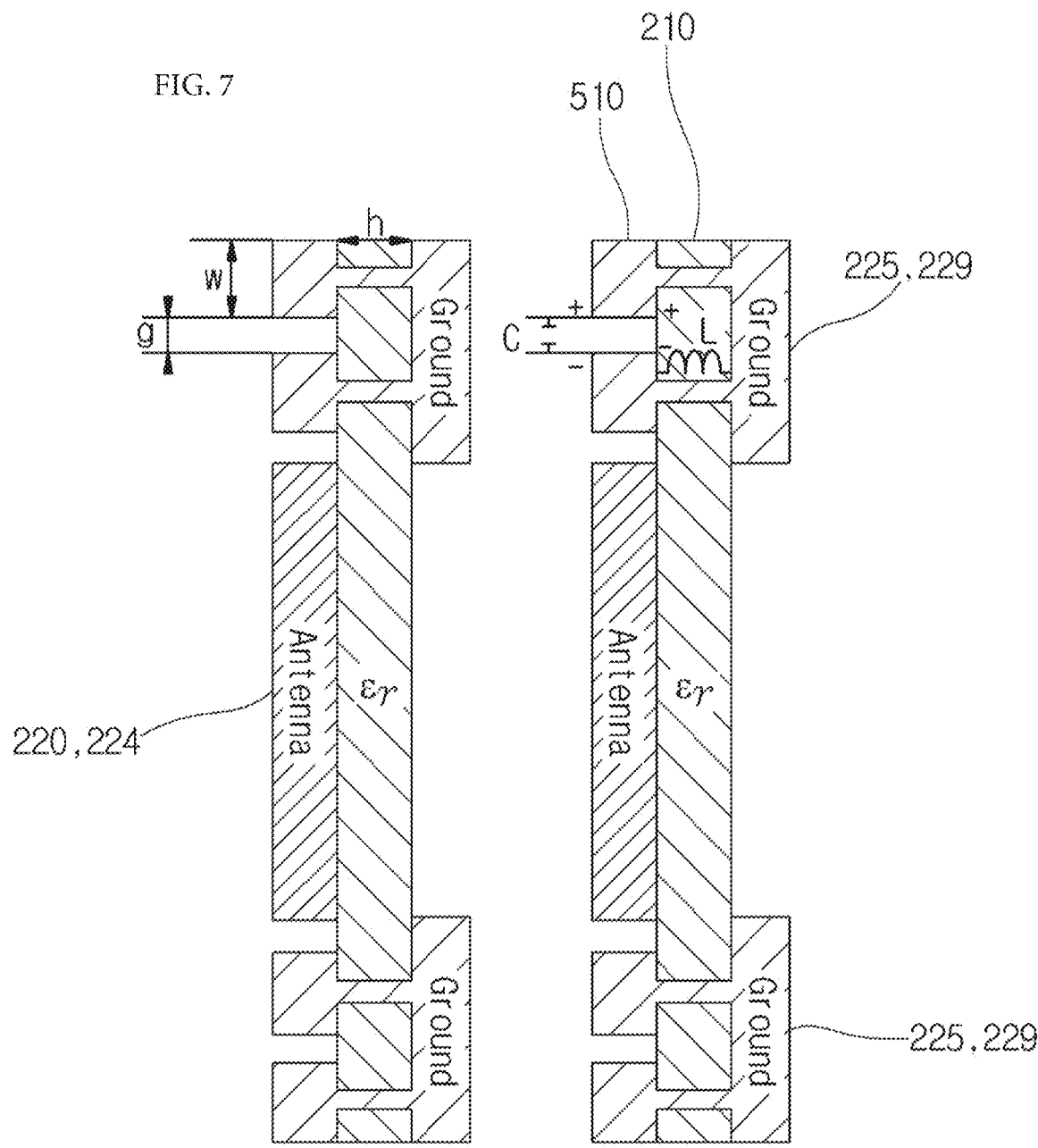
FIG. 7 is a view illustrating a method for calculating the size of the unit cell 510 and an interval between the unit cells 510 for obtaining a resonance frequency of the WAVE communication manner according to an embodiment of the present disclosure.

FIG. 7 is a view illustrating a method for calculating the size of the unit cell 510 and an interval between the unit cells 510 for obtaining a resonance frequency of the WAVE communication manner according to an embodiment of the present disclosure.

The resonant frequency $\omega_0$ of the WAVE antenna is about 5.850 GHz to about 5.925GHz and referring to FIG. 7, the resonant frequency may be obtained by using $$\omega_0 = \frac{1}{\sqrt{LC}}.$$

Here, L denotes inductance generated between the unit cell 510 and the second patch or the third patch connected by a though hole, and C denotes capacitance generated between two unit cells 510. In addition, the L and C may be obtained by using L=$\mu_0$h, and $$C = \frac{W\varepsilon_0(1+\varepsilon_r)}{\pi\cosh^{-1}\left(\frac{W+g}{g}\right)}.$$

Here, $\mu_0$ is permeability in vacuum and $\mu_0 = 4\pi \times 10^{-7}$ [H/m], h denotes a height of the dielectric substrate 210. In addition, $\varepsilon_0$ denotes permittivity in vacuum and is $\varepsilon_0 = 8.854 \times 10^{-12}$ [F/m] and is a dielectric constant of the dielectric substrate 210 and is a ratio of permeability of the dielectric substrate 210 over the permeability in vacuum. When Teflon is used as the dielectric substrate 210, $\varepsilon_r$ may be 2.2. W denotes the length of one side of the unit cell 510 of a square shape, and g denotes an interval between the unit cells 510. With the foregoing equations, h, W and g may be obtained to tune to the resonant frequency used in the WAVE communication manner.

In order to check performance improvement of the vehicle's WAVE antenna to which the foregoing electromagnetic bandgap is applied, simulation was performed which a return loss and a radiation pattern are compared for an existing WAVE antenna to which an electromagnetic bandgap is not applied.

Figure 8:
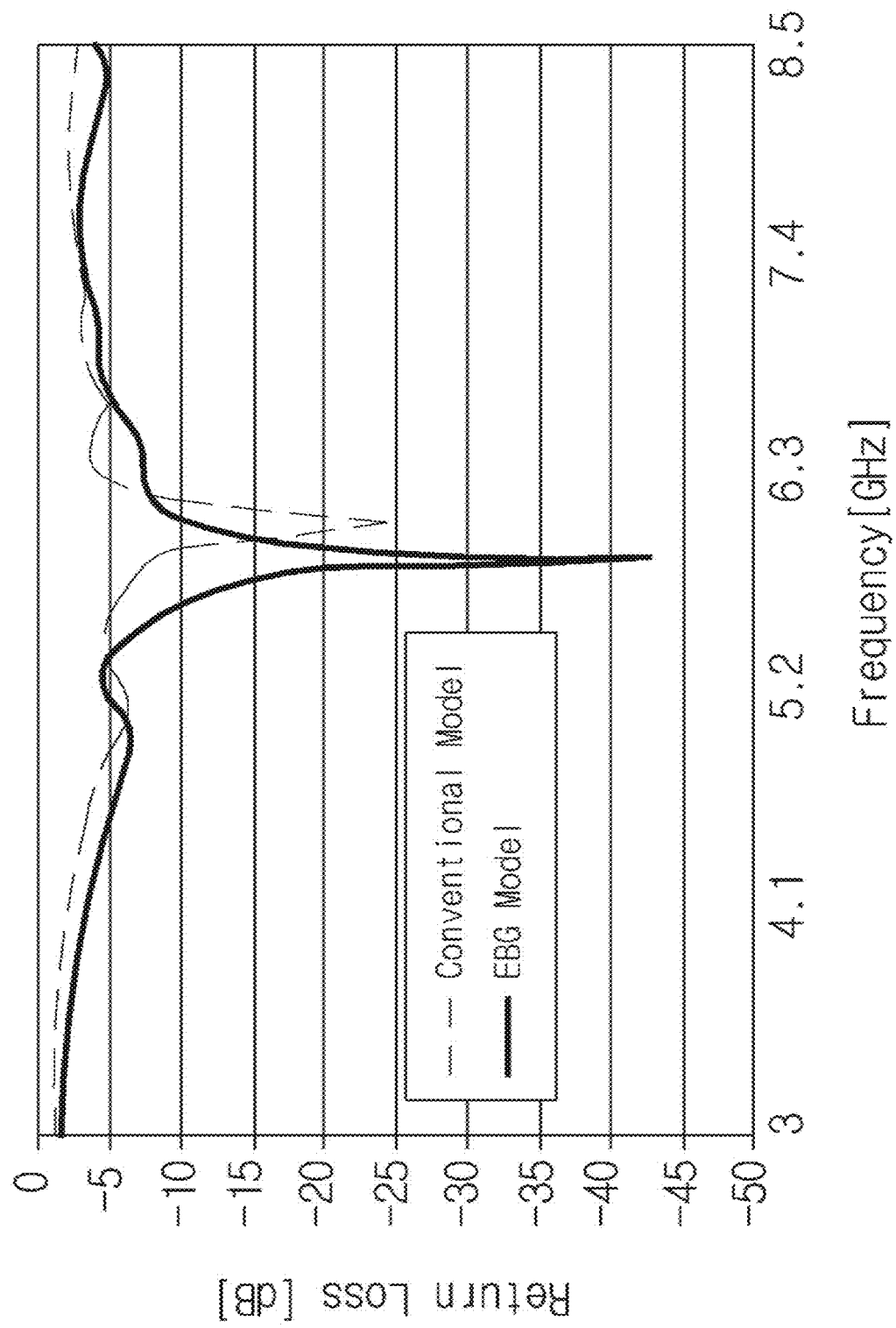
FIG. 8 illustrates a result of comparing reflection losses of the existing WAVE antenna and the WAVE antenna to which the electromagnetic bandgap is applied through simulation.

FIG. 8 illustrates a result of comparing reflection losses of the existing WAVE antenna and the WAVE antenna to which the electromagnetic bandgap is applied through simulation.

Referring to FIG. 8, for the existing WAVE antenna, the return loss shows a result value of −25 dB. For the WAVE antenna to which the electromagnetic bandgap suggested by the present disclosure is applied, the return loss shows a result value of −43 dB, which shows that the return loss may be reduced by about 18 dB.

Figure 9:
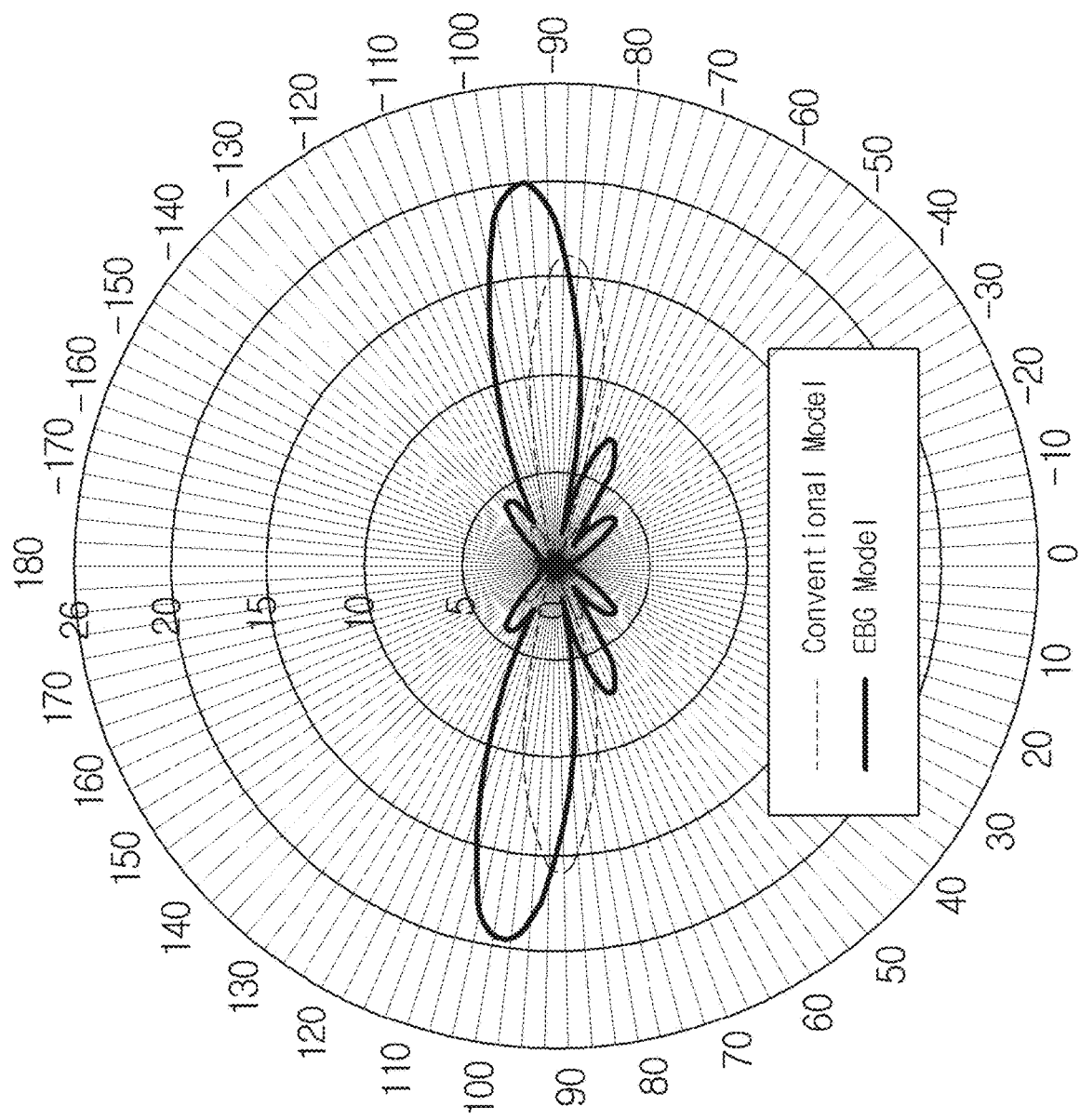
FIG. 9 illustrates a result of comparing radiation patterns of the existing WAVE antenna and the WAVE antenna to which an electromagnetic bandgap is applied through simulation.

FIG. 9 illustrates a result of comparing radiation patterns of the existing WAVE antenna and the WAVE antenna to which the electromagnetic bandgap is applied through simulation.

Referring to FIG. 9, for the existing WAVE antenna, the maximum intensity of the radiation pattern shows about 17 dB, while for the WAVE antenna to which the electromagnetic bandgap is applied, the maximum intensity shows 20 dB, which shows the electric field intensity may be improved by about 3 dB.

Referring to the foregoing simulation results or the like, the WAVE antenna to which the electromagnetic band of the present disclosure is applied shows considerable performance improvement in comparison to the existing WAVE antenna.

Figure 10:
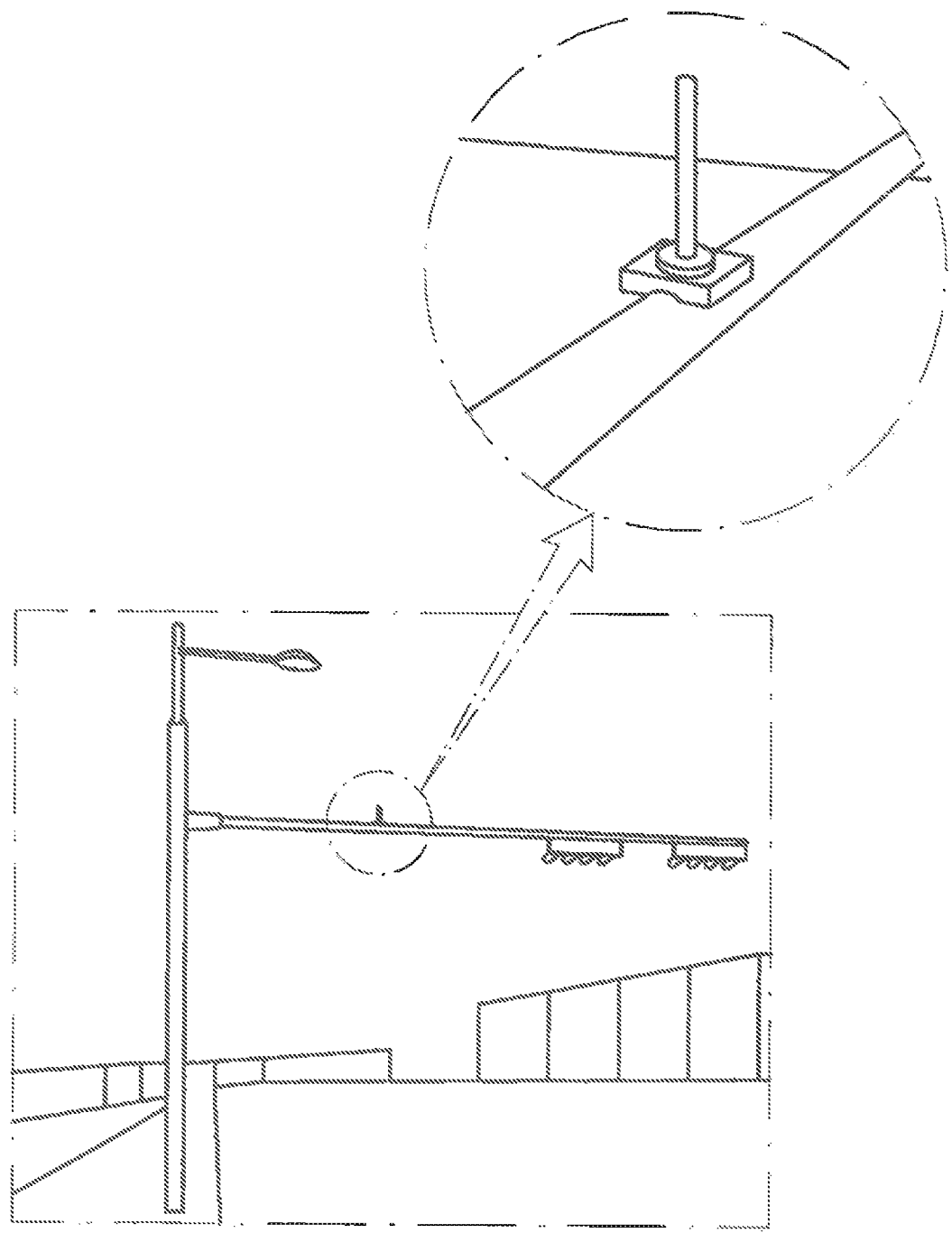
FIG. 10 is a view showing an example that a WAVE antenna manufactured according to an embodiment of the present disclosure is applied to a downtown crossroad.

FIG. 10 is a view illustrating an example that the WAVE antenna manufactured according to an embodiment of the present disclosure is applied to a downtown crossroad.

Referring to FIG. 10, a WAVE antenna manufactured according to an embodiment of the present disclosure may be installed on a traffic light, and vehicles positioned in the vicinity of the traffic light may obtain information from the WAVE antenna through WAVE communication capable of using cooperative driving environment.

The WAVE antenna according to the present disclosure may be applied for a base station or a large-scale vehicle. The large-scale vehicle has a broad area and has service limitations when an antenna is configured of an existing shark antenna. For example, when the antenna is positioned at the front side, V2V is smooth with a vehicle ahead but is not smooth with a vehicle behind. In this case, when the WAVE antenna of the present disclosure is applied, the coverage is wide and a V2V service with the vehicle behind may be smoothly supported.

Hereinbefore, embodiments are provided on the basis of a 5 GHz band for the WAVE communication capable of using a cooperative driving environment in order to explain the antenna suggested in the present disclosure, but the antenna suggested in the present disclosure is useable as an antenna for other communication manners and it should be interpreted to be included in the scope of the present disclosure.

The WAVE antenna according to the present disclosure may adopt an electromagnetic gap to suppress generation of a radio wave interference factor which is generated in a surrounding environment and may improve performance thereof.

Since the present disclosure can be implemented in other detailed forms without changing the technical spirit or essential features of the present disclosure, those skilled in the art will appreciate that the embodiments of the present disclosure are not restrictive but illustrative. The scope of the present disclosure is presented by the accompanying Claims rather than the foregoing description. It should be understood that all changes or modifications derived from the definitions and scopes of the Claims and their equivalents fall within the scope of the present disclosure.

While the present disclosure has been described with respect to the specific embodiments, it will be apparent to those skilled in the art that various changes and modifications may be made without departing from the spirit and scope of the invention as defined in the following claims.

What is claimed is:

1. An antenna comprising:
    a dielectric substrate provided with conduction patterns formed on opposite surfaces thereof;
    a plurality of first patches disposed on a first surface of the dielectric substrate at positions spaced apart from each other at regular intervals, and conducted to each other, each of the first patches having a rectangular shape;
    a plurality of second patches disposed on a second surface of the dielectric substrate at positions spaced apart from each other at regular intervals, and conducted to each other, each of the second patches having a rectangular-shape;
    a third patch provided in a bottom of the second surface of the dielectric substrate and conducted to the plurality of second patches; and
    a plurality of electromagnetic bandgap structures positioned on the first surface of the dielectric substrate and conducted to the plurality of second patches or the third patch by a through hole.

2. The antenna according to claim 1, wherein the plurality of electromagnetic bandgap structures are positioned on the first surface of the dielectric substrate at positions corresponding to the second patches or the third patch.

3. The antenna of claim 2, wherein each of the electromagnetic bandgap structures comprises a plurality of unit cells having a predetermined shape, the plurality of unit cells are spaced apart from each other at regular intervals, and each of the plurality of unit cells is conducted to the second patches or the third patch by a through hole.

4. The antenna according to claim 3, wherein the unit cell has a square shape and a resonant frequency ($\omega_0$) of the antenna is determined by adjusting a length (W) of one side of the unit cell and the interval (g) between the unit cells.

5. The antenna according to claim 4, wherein the length (W) of one side of the unit cell and the interval (g) between the unit cells are determined by equations of $$\omega_0 = \frac{1}{\sqrt{LC}}, L = \mu_0 h, \text{ and } C = \frac{W\varepsilon_0(1+\varepsilon_r)}{\pi\cosh^{-1}\left(\frac{W+g}{g}\right)}$$

where $\mu_0$ denotes permeability in vacuum and $\mu_0 = 4\pi \times 10^{-7}$ [H/m], h denotes a height of the dielectric substrate, $\varepsilon_0$ denotes permittivity in vacuum and is $\varepsilon_0 = 8.854 \times 10^{-12}$ [F/m], and $\varepsilon_r$ is a dielectric constant of the dielectric substrate.

6. The antenna according to claim 5, wherein the dielectric substrate is manufactured with any one or more materials of FR-4, Teflon and an epoxy resin.

7. The antenna according to claim 2, wherein the dielectric substrate is manufactured with any one or more materials of FR-4, Teflon and an epoxy resin.

8. The antenna according to claim 3, wherein the dielectric substrate is manufactured with any one or more materials of FR-4, Teflon and an epoxy resin.

9. The antenna according to claim 4, wherein the dielectric substrate is manufactured with any one or more materials of FR-4, Teflon and an epoxy resin.

10. The antenna according to claim 1, wherein the dielectric substrate is manufactured with any one or more materials of FR-4, Teflon and an epoxy resin.

* * * * *